(12) United States Patent
Hall

(10) Patent No.: US 11,086,104 B2
(45) Date of Patent: Aug. 10, 2021

(54) COMPACT OBJECTIVE LENS FOR NEAR-INFRARED IMAGING

(71) Applicant: United States of America, as represented by the Secretary of the Army, Fort Belvoir, VA (US)

(72) Inventor: John M. Hall, Stafford, VA (US)

(73) Assignee: UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 225 days.

(21) Appl. No.: 16/574,498

(22) Filed: Sep. 18, 2019

(65) Prior Publication Data
US 2020/0409067 A1 Dec. 31, 2020

Related U.S. Application Data

(60) Provisional application No. 62/866,033, filed on Jun. 25, 2019.

(51) Int. Cl.
*G02B 13/00* (2006.01)
*G02B 27/00* (2006.01)
(Continued)

(52) U.S. Cl.
CPC ..... *G02B 13/0035* (2013.01); *G02B 27/0025* (2013.01); *H04N 5/332* (2013.01);
(Continued)

(58) Field of Classification Search
CPC .. G02B 13/0045; G02B 9/60; G02B 27/0025; G02B 13/0035; G02B 3/04; G02B 5/208; G02B 13/002; H04N 5/332; H04N 5/2254
(Continued)

(56) References Cited

U.S. PATENT DOCUMENTS 3,926,504 A * 12/1975 Fleischman ............ G02B 13/18
359/714
4,458,991 A * 7/1984 Yamada ................... G02B 9/60
359/708
(Continued)

OTHER PUBLICATIONS

Yufeng Yan, Jose Sasian, "Miniature camera lens design with a freeform surface," Proc. SPIE 10590, International Optical Design Conference 2017, 1059012 (Nov. 27, 2017); doi: 10.1117/12.2292653.
(Continued)

*Primary Examiner* — Evelyn A Lester
(74) *Attorney, Agent, or Firm* — Richard J. Kim

(57) ABSTRACT

The current invention describes an objective lens assembly and its optical function somewhat based on commercial cell phone camera lens forms, but adapted and optimized as a compact objective lens for use in near-infrared night imaging applications. An exemplary compact objective lens for near-infrared imaging comprises a first lens element which is bi-convex, aspheric, and has positive optical power; a second lens element which is of a general meniscus shape to provide a net negative optical power; a third element which is generally bi-convex with aspheres to provide positive optical power; a positive powered fourth optical element bi-convex in general form with aspheric curvatures; a negative field corrector lens which is generally of meniscus shape with strong, high order aspheric curvatures; and a windowed detector assembly where an image is focused.

20 Claims, 5 Drawing Sheets

(51) Int. Cl.
*H04N 5/33* (2006.01)
*H04N 5/225* (2006.01)
*G02B 5/20* (2006.01)
*G02B 3/04* (2006.01)
*G02B 9/60* (2006.01)

(52) U.S. Cl.
CPC ............... *G02B 3/04* (2013.01); *G02B 5/208* (2013.01); *G02B 9/60* (2013.01); *G02B 13/002* (2013.01); *G02B 13/0045* (2013.01); *H04N 5/2254* (2013.01)

(58) Field of Classification Search
USPC .................................. 359/714, 740, 763, 764
See application file for complete search history.

(56) References Cited

U.S. PATENT DOCUMENTS

| | | | | |
|---|---|---|---|---|
| 4,501,474 A * | 2/1985 | Kimura | ................. | G02B 21/02 359/659 |
| 7,035,023 B2 * | 4/2006 | Nanba | ..................... | G02B 9/10 359/781 |
| 8,179,615 B1 | 5/2012 | Tang et al. | | |
| 8,331,032 B2 | 12/2012 | Heimer | | |
| 2001/0043409 A1 * | 11/2001 | Otomo | ................... | G02B 27/30 359/765 |
| 2013/0016435 A1 * | 1/2013 | Tsai | ................... | G02B 13/0045 359/714 |
| 2013/0265651 A1 * | 10/2013 | Ishizaka | ................ | G02B 1/041 359/714 |
| 2013/0279023 A1 * | 10/2013 | Chen | ...................... | G02B 13/18 359/714 |
| 2017/0192207 A1 * | 7/2017 | Chen | ...................... | G02B 5/005 |
| 2019/0324243 A1 * | 10/2019 | Abe | ................... | G02B 21/0072 |

OTHER PUBLICATIONS

Hall, John, "Tricks of the Trade", SPIE OE Magazine, Dec. 2002. Online at http://spie.org/news/tricks-of-the-trade?SSO=1.

Sooyong Nam, "Tolerance analysis using Zemax, the case for the small optics. OPTI521," University of Arizona internet paper dated Dec. 21, 2006; hyperlink https://wp.optics.arizona.edu/optomech/wp-content/uploads/sites/53/2016/10/Sooyong-Nam.pdf.

* cited by examiner

| Radius | Thickness | Index n @ 750 nm | Semi-Diameter | Conic | $r^4$ | $r^6$ | $r^8$ | $r^{10}$ | $r^{12}$ | $r^{14}$ | $r^{16}$ |
|---|---|---|---|---|---|---|---|---|---|---|---|
| Infinity | Infinity | 1.0000 | 0.00 | 0.000 | | | | | | | |
| Infinity | 1.231 | 1.0000 | 3.75 | 0.000 | | | | | | | |
| 27.948 | 2.475 | 1.5284 | 3.93 | -1.660 | 2.13E-05 | -8.56E-05 | 4.97E-06 | -2.63E-07 | | | |
| -12.515 | 0.359 | 1.0000 | 4.20 | 0.000 | -4.39E-04 | -4.71E-05 | 5.17E-07 | -4.52E-08 | | | |
| 7.906 | 1.695 | 1.6180 | 3.96 | 0.000 | -3.84E-03 | 9.92E-06 | -4.04E-06 | 3.95E-08 | 4.81E-09 | | |
| 3.948 | 0.700 | 1.0000 | 4.35 | -0.335 | -5.66E-03 | 1.63E-04 | -1.71E-05 | 9.15E-07 | -2.40E-08 | | |
| 10.464 | 2.640 | 1.5284 | 4.50 | 0.000 | -1.40E-03 | 1.73E-04 | -1.78E-05 | 1.48E-06 | -6.09E-08 | 9.15E-10 | |
| -437.480 | 0.360 | 1.0000 | 4.50 | -89.500 | 1.09E-03 | -4.52E-04 | 2.65E-05 | -4.71E-07 | | | |
| -297.979 | 2.925 | 1.5257 | 4.50 | -21.300 | 5.54E-03 | -5.94E-04 | 3.74E-05 | -1.10E-06 | 1.75E-08 | -1.73E-10 | |
| -4.809 | 0.358 | 1.0000 | 4.25 | 0.000 | 5.19E-03 | -1.25E-04 | 1.19E-05 | -5.67E-07 | 2.06E-08 | | |
| 5.338 | 1.800 | 1.5284 | 4.66 | 0.000 | -6.96E-03 | 2.00E-04 | -1.30E-04 | 4.67E-07 | -6.34E-09 | | |
| 2.750 | 2.878 | 1.0000 | 5.57 | -3.430 | -4.10E-04 | -2.21E-04 | 2.37E-05 | -1.37E-06 | 4.52E-08 | -7.95E-10 | 5.75E-12 |
| Infinity | 0.720 | 1.5118 | 6.11 | 0.000 | | | | | | | |
| Infinity | 0.288 | 1.0000 | 6.29 | 0.000 | | | | | | | |
| Infinity | 0.000 | 1.0000 | 6.41 | 0.000 | | | | | | | |

FIGURE 5

COMPACT OBJECTIVE LENS FOR NEAR-INFRARED IMAGING

CROSS-REFERENCE TO RELATED APPLICATIONS

This application claims priority to U.S. Provisional Patent Application No. 62/866,033, filed on Jun. 25, 2019, the disclosure of which is incorporated herein by reference in its entirety.

GOVERNMENT INTEREST

The invention described herein may be manufactured, used, sold, imported, and/or licensed by or for the Government of the United States of America.

FIELD OF THE INVENTION

This invention is applicable to the field of optics for infrared imaging, particularly in regards to an objective lens for near-infrared imaging.

BACKGROUND OF THE INVENTION

Commercial cell phone products employ extremely complex objective lens assemblies in order to provide high quality imagery within a very small volume. The cell phone camera lens assembly typically consists of three to six individual lens elements, of which most have complex non-spherical surface shapes in order to correct geometric aberrations over a large field of view and relatively fast F# value. Generally speaking, the faster (i.e., lower value) of the F#, the better the image quality under low light darkness conditions. For example, U.S. Pat. No. 8,179,615 describes several embodiments of the current art of a cellphone camera lens having fields of view ranging from ±30.6° to ±40.2° and F#'s varying between 2.20 and 2.60. These embodiments are all optimized for best performance over the visible wavelength spectrum from 486.1 nm to 656.3 nm. They also provide very low optical distortion, generally no worse than ±3%. The individual elements are made from optical plastic materials which are capable of being molded in mass quantities to reduce cost. The physical length of these assemblies is on the order of about 4.8 mm, and the image format of roughly ±4.5 mm is sized for a typical cell phone CMOS imager with perhaps 1280×720 pixels having 0.0035 mm pitch. The commercial cell phone camera lenses are not ideal for night imaging however, where there is a need for imaging over the near-infrared spectrum from 650 nm to 850 nm, along with more difficult requirements for both faster F#'s, on the order of 1.35 or lower, as well as larger focal plane format pixel sizes on the order 0.010 mm which have an increased light gathering area compared to smaller commercial pixel pitches. Simple linear scaling of the prior art forms for the larger pixel size is not sufficient to provide faster F#'s with near diffraction-limited image quality in the near-infrared spectrum. It is well known in the art of optical design that while a design optimized for a fast F# may be "stopped down" for operation at a slower F# and still maintain a given geometric image quality, the reverse of this situation is not true.

SUMMARY OF THE INVENTION

The current invention describes an objective lens assembly optical design somewhat based on commercial cell phone camera lens forms, but adapted and optimized for use in near-infrared night imaging applications.

An exemplary compact objective lens for near-infrared imaging comprises a first lens element which is bi-convex, aspheric, and has positive optical power; a second lens element which is of a general meniscus shape to provide a net negative optical power; a third element which is generally bi-convex with aspheres to provide positive optical power; a positive powered fourth optical element bi-convex in general form with aspheric curvatures; a negative field corrector lens which is generally of meniscus shape with strong, high order aspheric curvatures; and a windowed detector assembly where an image is focused.

BRIEF DESCRIPTION OF THE DRAWINGS

Additional advantages and features will become apparent as the subject invention becomes better understood by reference to the following detailed description when considered in conjunction with the accompanying drawings wherein:

FIG. 5 shows a lens prescription listing with the parameters of radius of curvature, thickness, index of refraction, semi-diameter, and then conic and aspheric coefficients.

DETAILED DESCRIPTION

The current invention describes an objective lens assembly optical design somewhat based on commercial cell phone camera lens forms but adapted and optimized for use in near-infrared night imaging applications. The significant performance characteristics include maintaining near-diffraction limited image resolution over a wide ±32.5° field of view while operating in the near-infrared spectrum from 650 nm to 850 nm and having a relatively faster F# on the order of 1.35 or lower. The length of the optical assembly is approximately 18.5 mm and the format size is a larger ±6.4 mm to accommodate larger 0.010 mm pixel sizes in a 1280×720 element array. The invention is best understood by referencing the ray trace drawing shown in FIG. 1.

Figure 1:
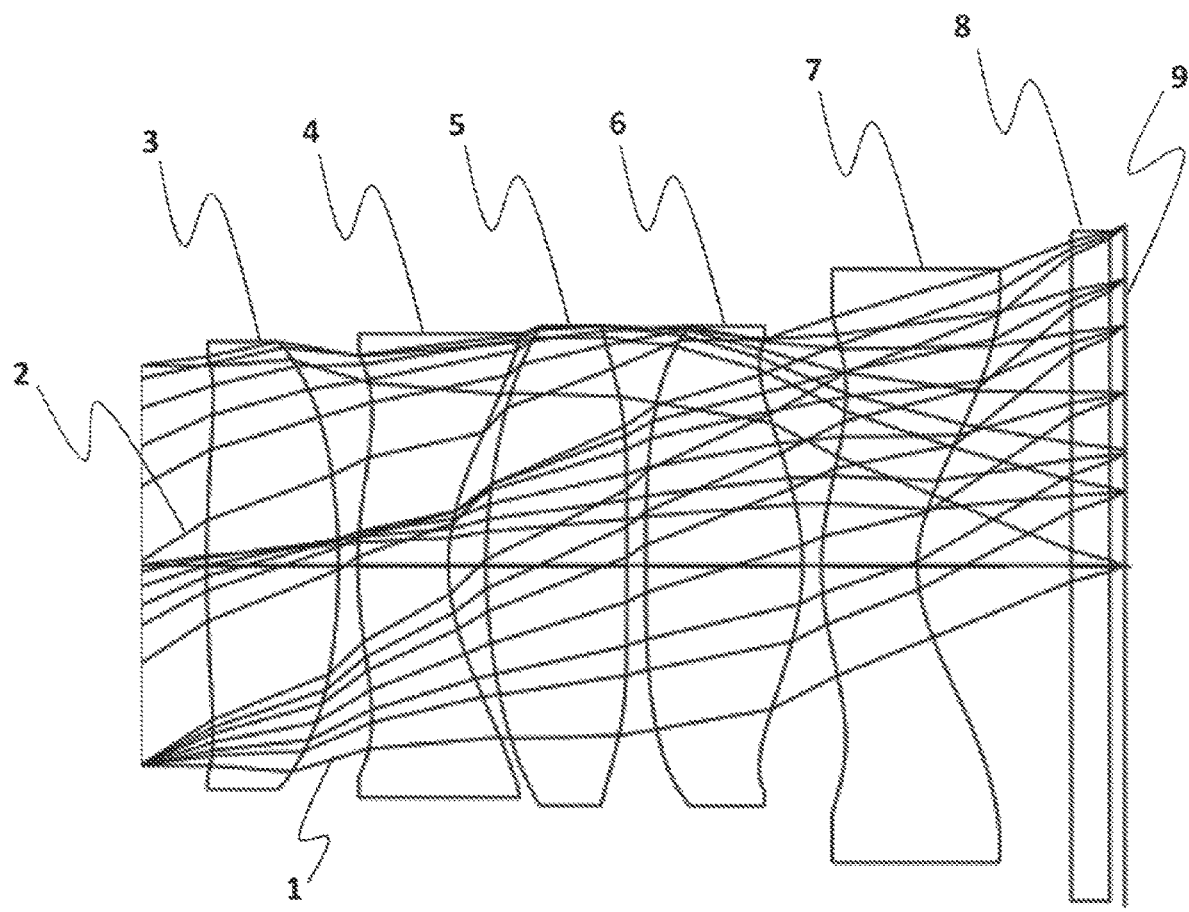
FIG. 1 shows an exemplary arrangement of compact objective lens for near-infrared imaging with ray traces.

Referencing the ray trace in FIG. 1, light ray bundles from a scene for the central field of view 1 and ray bundles for the edges of the field 2, and all fields between, enter through the first lens element 3 which is bi-convex, aspheric, and has positive optical power. This lens may preferable be made of a material such as the Cyclic Olefin Copolymer (COC), with trade names such as "Topas" sold by Topas Advanced Polymers GmbH, having an index Nd=1.5337 and dispersion Vd=56.288. It has a paraxial optical power of approximately 59.8 diopters. The light rays then enter the second lens element 4 which is of a general meniscus shape, i.e. having a concave surface on one side and a convex surface on the other, along with aspherics to provide a net negative optical power. This lens is preferably made of a material such as AL-6263-(OKP4HT), which is sold commercially by AngstromLink, with an index Nd=1.6319 and dispersion Vd=23.328. It has a paraxial optical power of about −65.5 diopters. The light rays then pass through the third element 5 which is generally bi-convex with aspheres to provide positive optical power. This lens is preferable made of COC material. It has an optical power of approximately 51.6 Diopters. Light then enters the positive powered fourth optical element 6 which again is bi-convex in general form, and also with aspheric curvatures. This lens element is preferably made from a Cyclic Olefin Polymer (COP) such as the trade name "E48R" from Zeon Corp. It has an index Nd=1.5312 and dispersion Vd=56.044. It has an optical power of about 107.93 Diopters. Note that this bi-convex fourth element 6 is significantly different from the meniscus-shaped fourth elements (140, 240, 340, 440, 540, 640, 740 & 840) described in the U.S. Pat. No. 8,179,615 prior art for commercial camera lenses. The light rays then enter the negative field corrector lens 7 which is generally of meniscus shape with strong, high order aspheric curvatures. This lens is preferably made from COC material. It has an optical power of about −70.7 Diopters. A flat glass window or filter element 8 is then accounted for in the optical path as it may be part of the detector assembly which in turn also provides the detector pixel locations in the plane 9 where the image is focused. The total optical physical length is about 17.2 mm, and the total mass of the plastic elements and the glass window is on the order of 1.04 grams.

Figure 2:
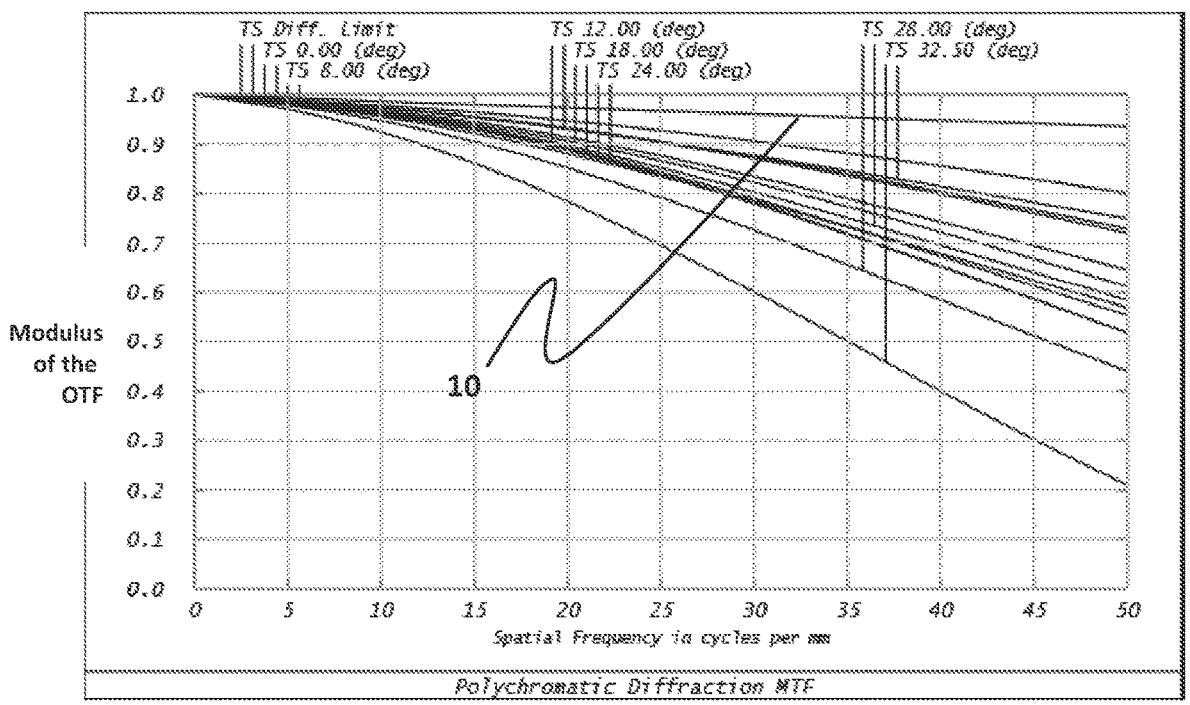
FIG. 2 shows a plot of the Modulation Transfer Function of the lens, which is a comprehensive measure of the resolution of the lens image.

The next following FIG. 2 shows a plot of the Modulation Transfer Function of the lens, which is a comprehensive measure of the resolution of the lens image. The top curve 10 shows the diffraction limit, which is the MTF of a theoretically perfect lens with no geometric aberrations. The curves below 10 are representative of the design itself, which is very near to the diffraction limit over most of the field of view as measured out to 50 cycles per milliradian in angular space, which is the Nyquist sampling cutoff frequency of a detector with 0.010 mm pitch.

Figure 3:
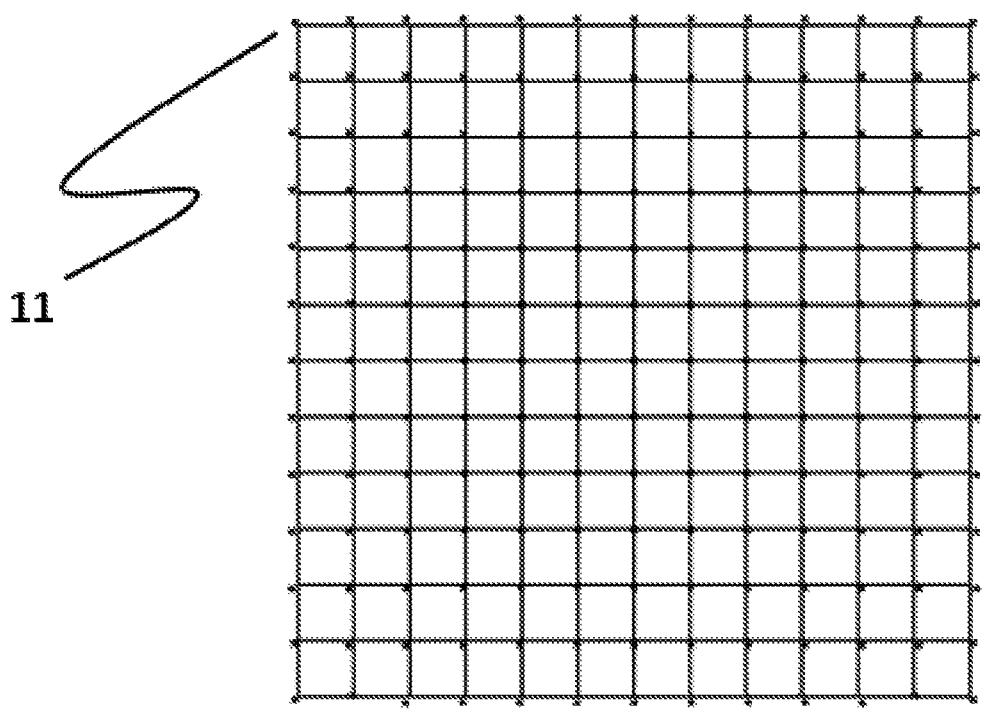
FIG. 3 shows a plot of the geometric distortion of a lens image.

The next following FIG. 3 shows a plot of the geometric distortion of the lens image. The grid of continuous lines shows the ideal case of 0% distortion, and the large array of dots mark the positions as mapped through the lens. The farthest dot mark 11 corresponds to a maximum distortion of +1.95%.

Figure 4:
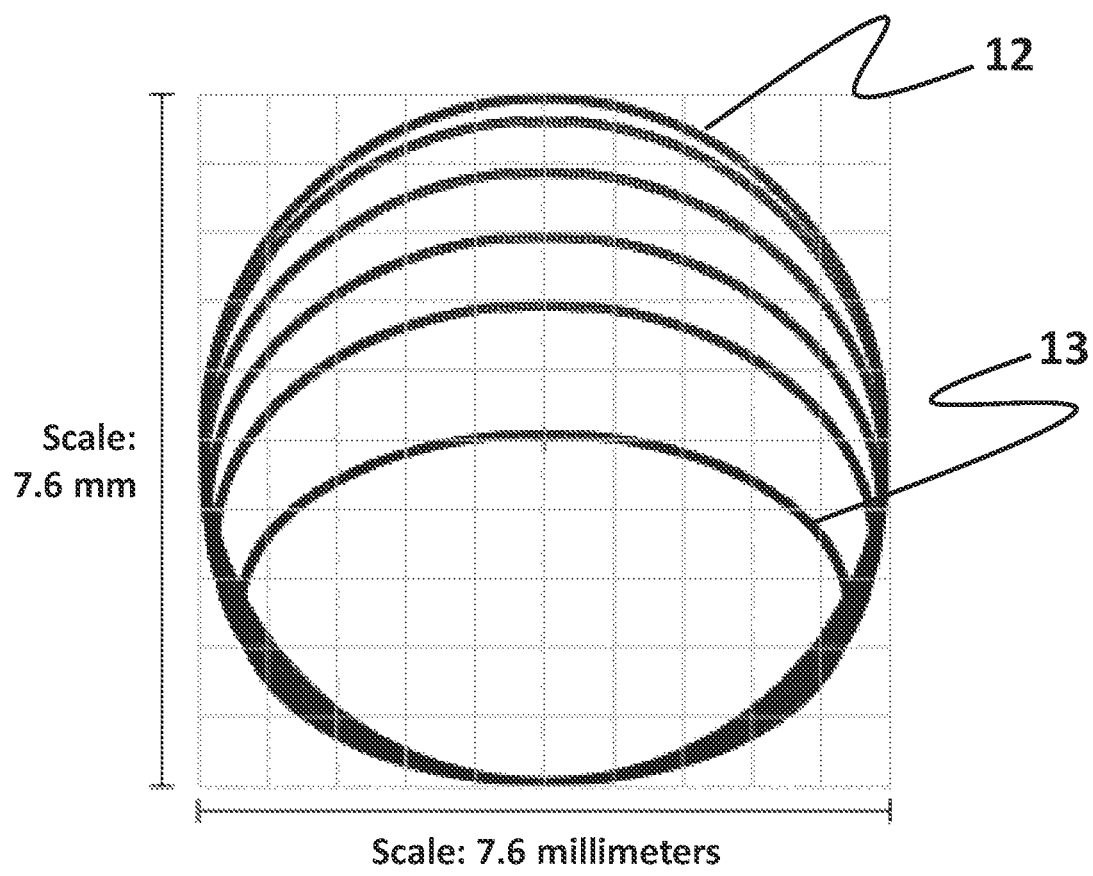
FIG. 4 shows a plot of the beam footprints for several field positions as seen in the plane of an air gap sitting 1.231 mm in front of a first lens.

The next following FIG. 4 shows a plot of the beam footprints for several field positions as seen in the plane of an air gap sitting 1.231 mm in front of the first lens 3. The largest footprint 12 corresponds to the on-axis field ray bundle, indicating that this field is operating at the paraxial F# of 1.33. Subsequent fields show gradually increasing vignetting, finally resulting in the footprint 13 which corresponds to the farthest edge of the field of view. This farthest field position has about 45.36% of the light relative to the on-axis ray bundle. The use of vignetting to obtain a very fast axial F# is explained in the reference, OE Magazine 2002, "Tricks of the Trade", and is a significant difference from the prior art exhibited by U.S. Pat. No. 8,179,615. (Hall, John, "Tricks of the Trade", SPIE OE Magazine, December 2002, is incorporated by reference.)

The table in the next FIG. 5 shows the lens prescription listing with the parameters of radius of curvature, thickness, index of refraction, semi-diameter, and then conic and aspheric coefficients. The sag of the lens curvatures is defined by the following equation where "z"=sag, "c"=spherical radius of curvature, "k"=conic constant, "r" is the position along the semi-diameter, and the coefficients "ax" correspond to the even-ordered aspheric polynomial terms:

$$z=[(cr^2) \div (1+SQRT(1-(1+k)c^2r^2))]+\alpha_1 r^4+\alpha_2 r^6+\alpha_3 r^8+\alpha_4 r^{10}+\alpha_5 r^{12}+\alpha_6 r^{14}+\alpha_7 r^{16}$$

Materials with an index=1.000 are assumed to be air gaps, and all values within the table assume nominal temperature 20° C. and pressure of 1 atmosphere.

The following comparison illustrates the critical differences between the prior art and the current invention in terms of general lens shape factor:

| Element # | Prior Art Shape Factor | Invention Shape Factor |
|---|---|---|
| 1 | Convex | Bi-convex |
| 2 | Meniscus | Meniscus |
| 3 | Bi-convex | Bi-convex |
| 4 | Meniscus | Bi-convex |
| 5 | Meniscus | Meniscus |
| 6 | Planar window | Planar window |

The same types of aspheric surface polynominals are employed in the current invention as was done in the prior art. The principle novelty in achieving the operation in the near infrared spectral band with a faster F# therefore lies in the different shape factor of the fourth element combined with the discretionary use of vignetting for the edges of field of view.

It is obvious that many modifications and variations of the present invention are possible in light of the above teachings. It is therefore to be understood that within the scope of the appended claims, the invention may be practiced otherwise than as described.

What is claimed is:

1. A compact objective lens assembly along an optical path for near-infrared imaging, comprising:
   a first lens element which is bi-convex, aspheric, and has positive optical power;
   a second lens element which is of a meniscus shape to provide a net negative optical power;
   a third element which is bi-convex with aspheres to provide positive optical power;
   a positive powered fourth optical element bi-convex in form with aspheric curvatures;
   a negative field corrector lens which is of meniscus shape with strong, high order aspheric curvatures; and
   a windowed detector assembly disposed where an image is focused along the optical path for near-infrared imaging, wherein said compact objective lens assembly provides an F# at least as fast as 1.35.

2. The compact objective lens assembly according to claim 1, wherein the compact objective lens assembly has a length of approximately 18.5 mm; and its format size is a larger ±6.4 mm to accommodate larger 0.010 mm pixel sizes in a 1280×720 element array.

3. The compact objective lens assembly according to claim 1, wherein the first lens element is based on a Cyclic Olefin Copolymer lens material.

4. The compact objective lens assembly according to claim 1, wherein the first lens element is characterized by an index Nd=1.5337; dispersion Vd=56.288; and a paraxial optical power of approximately 59.8 diopters.

5. The compact objective lens assembly according to claim 1, wherein the second lens element has a concave surface on one side and a convex surface on another side, along with aspherics to provide a net negative optical power.

6. The compact objective lens assembly according to claim 1, wherein the second lens element is characterized by an index Nd=1.6319; dispersion Vd=23.328; and a paraxial optical power of about −65.5 diopters.

7. The compact objective lens assembly according to claim 1, wherein the third element is based on a Cyclic Olefin Copolymer lens material.

8. The compact objective lens assembly according to claim 1, wherein the third element has an optical power of approximately 51.6 Diopters.

9. The compact objective lens assembly according to claim 1, wherein the positive powered fourth optical element is based on a Cyclic Olefin Polymer lens material.

10. The compact objective lens assembly according to claim 1, wherein the positive powered fourth optical element is characterized by an index Nd=1.5312; dispersion Vd=56.044; and an optical power of about 107.93 Diopters.

11. The compact objective lens assembly according to claim 1, wherein the negative field corrector lens is based on a Cyclic Olefin Copolymer lens material.

12. The compact objective lens assembly according to claim 1, wherein the negative field corrector lens has an optical power of about −70.7 Diopters.

13. The compact objective lens assembly according to claim 1, wherein the windowed detector assembly has an optical window through which an image is focused along the optical path onto a plane having detector pixel locations for near-infrared imaging.

14. The compact objective lens assembly according to claim 13, wherein said optical window is either a flat glass window or a filter element.

15. The compact objective lens assembly according to claim 1, wherein a total optical physical length is about 17.2 mm, and a total mass is on the order of 1.04 grams.

16. A method of near-infrared imaging using the compact objective lens assembly along an optical path according to claim 1, the steps of the method of near-infrared imaging comprising:

light ray bundles from a scene enter through the first lens element which is bi-convex, aspheric, and has positive optical power to produce first light rays;

the first light rays then enter the second lens element of a meniscus shape to provide a net negative optical power to its second light rays;

the second light rays then pass through the third element which is bi-convex with aspheres to provide positive optical power to its third light rays;

the third light rays then enter the positive powered fourth optical element which is bi-convex in form and with aspheric curvatures to produce fourth light rays;

the fourth light rays then enter the negative field corrector lens which is of meniscus shape with strong, high order aspheric curvatures to produce field corrected light rays; and said field corrected light rays pass through an optical window disposed along the optical path to be focused on detector pixel locations as a focused image.

17. The method of near-infrared imaging according to claim 16, wherein said light ray bundles from a scene are comprised of light ray bundles from a scene for the central field of view, light ray bundles for edges of the field, and light ray bundles from all fields between.

18. The method of near-infrared imaging according to claim 16, wherein said second lens element of a meniscus shape has a concave surface on one side and a convex surface on another side, along with aspherics to provide a net negative optical power to its second light rays.

19. The method of near-infrared imaging according to claim 16, wherein said optical window disposed along the optical path is a flat glass window or filter element disposed in said optical path as a part of its detector assembly having said detector pixel locations in a plane to which said image is focused.

20. The method of near-infrared imaging according to claim 16, wherein its near-diffraction limited image resolution is achieved over a wide ±32.5° field of view while operating in a near-infrared spectrum from 650 nm to 850 nm and having a relatively faster F# on the order of 1.35 or lower.

* * * * *